June 6, 1961  C. C. WRIGLEY  2,987,346
FRONT AND REAR BRAKING FORCE REGULATING MECHANISM
Filed July 30, 1958  2 Sheets-Sheet 1
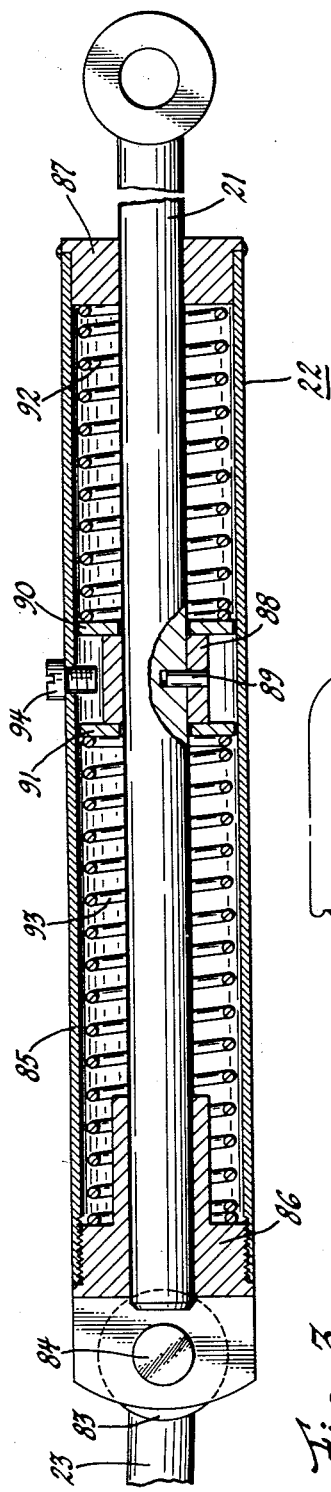
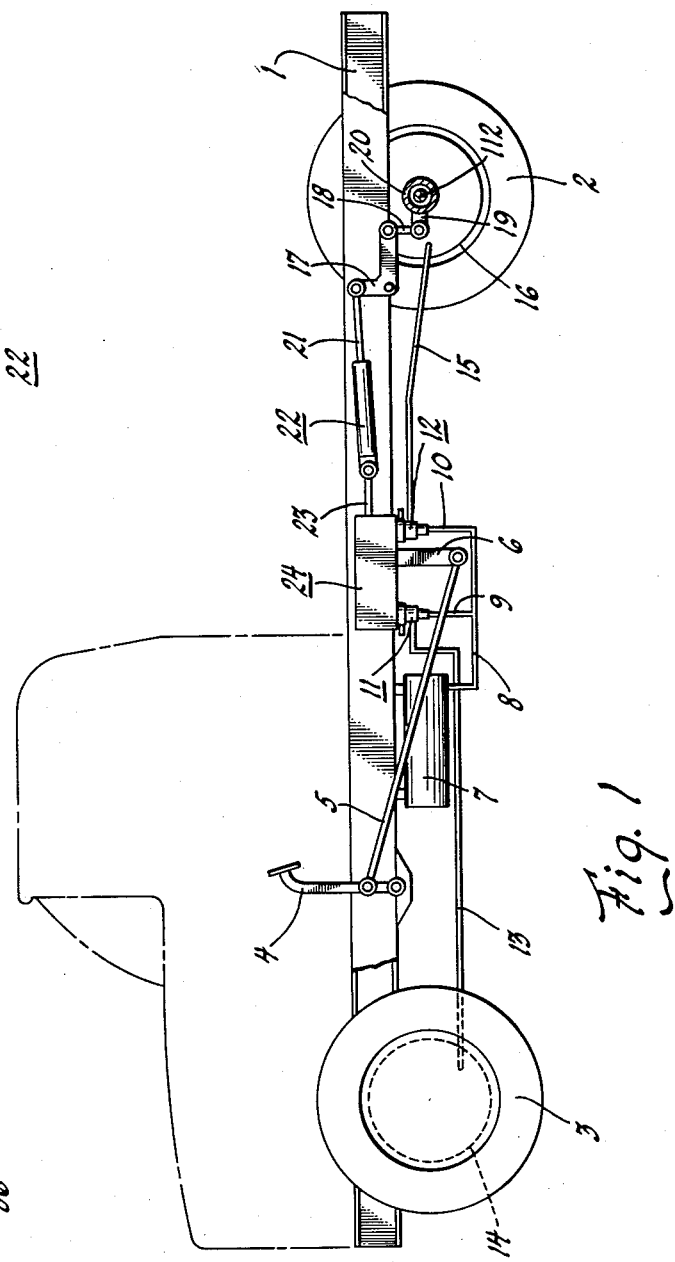
INVENTOR.
Clifford C. Wrigley
BY
D. C. Staley
HIS ATTORNEY

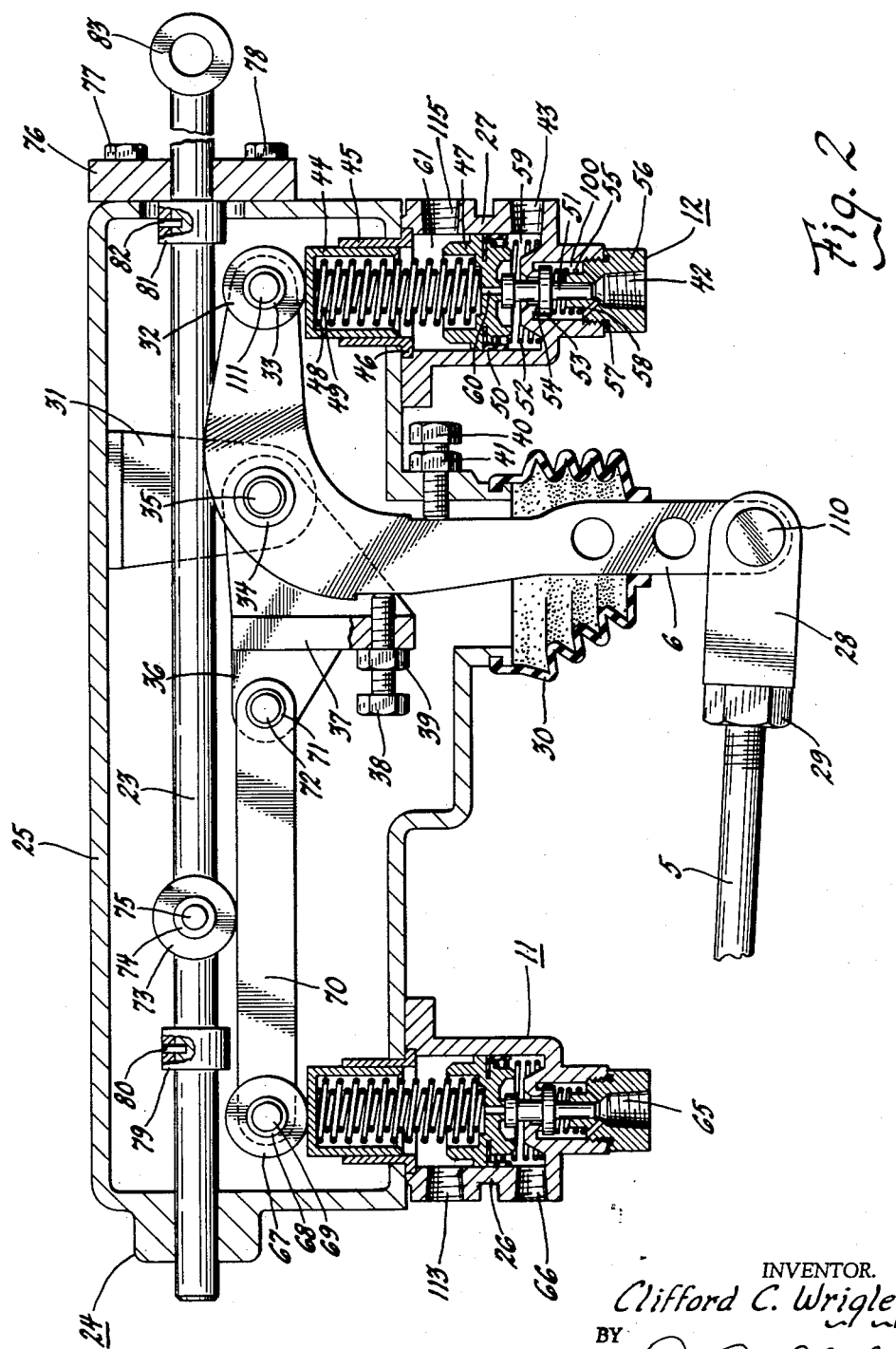

United States Patent Office 2,987,346
Patented June 6, 1961

2,987,346
FRONT AND REAR BRAKING FORCE
REGULATING MECHANISM
Clifford C. Wrigley, Grosse Pointe Woods, Mich., assignor to General Motors Corporation, Detroit, Mich., a corporation of Delaware
Filed July 30, 1958, Ser. No. 751,956
3 Claims. (Cl. 303—6)

This invention relates to a vehicle brake control and more particularly to an automatic mechanism for regulating the front and rear braking force.

It is customary to provide braking of vehicles with a constant proportion of the braking force in relation of the front-to-rear wheels. This means of braking does not prove entirely satisfactory in the usage with a cargo-carrying vehicle. The braking effort on the rear wheels is usually much larger in proportion to the front wheel braking effort for satisfactory full load braking of the vehicle. As the vehicle is operated with part load or no load, the braking is not satisfactory with this proportion of braking as the rear wheels have a tendency to skid upon application of the brakes. A device incorporated with the brake controls which would regulate the braking effort of the rear-to-front wheels in relation to the load carried would be a definite improvement for the operating of the brakes.

It is an object of this invention to provide an automatic mechanism responsive to the load carried on a vehicle for regulating the braking force of the front wheels in relation to the rear wheel brakes.

It is another object of this invention to provide a mechanical device which operates in response to a variable distance between the vehicle frame and the rear axle thereby controlling the fluid valves for operating the front and the rear brakes and regulating the front-to-rear braking effort in response to the load on the vehicle.

It is a further object of this invention to provide a shock absorber mechanism operating in conjunction with the mechanical regulating device. This shock absorber eliminates damage to the control mechanism by providing a dampening means connected to the regulating device. This shock absorber eliminates sudden shocks from being transmitted to the control valve mechanism.

It is a further object of this invention to provide a linkage mechanism operating in response to the load carried on the vehicle by changing the fulcrum on one of the valve control levers which operates either the front or rear wheel brakes.

It is a further object of this invention to provide adjustments within the control mechanism for operating the valves to provide the desired initial setting on the control mechanism.

The objects of this invention are accomplished by means of a linkage and lever arrangement which is mounted on the frame of the vehicle. A link is also connected from this mechanism to an arm on the rear axle which provides for actuation as the distance between the frame and the rear axle varies according to the load carried on the vehicle.

The linkage mechanism is also provided with a shock absorber for eliminating sudden shocks due to bumps which may be present in the road where the vehicle is traveling. This linkage mechanism, which operates in response to the load of the vehicle, controls the fulcrum point of the lever for operating the front brake control valve. The lever for operating the rear brake control valve is of a constant proportioned lever means. By changing the fulcrum point on the lever which operates the front valve, the pressure input to the front brakes may be increased and decreased in an inverse relation to the load on the vehicle. Both valves are operated by a single brake lever which is controlled by the operator of the vehicle. The device as illustrated is provided with air pressure for actuating of brakes and is entirely controlled by varying the amount of air pressure applied to the front wheel brakes in relation to the rear wheel brakes.

Further objects and advantages of the present invention will be apparent from the following description, reference being had to the accompanying drawings wherein a preferred embodiment of the present invention is clearly shown.

In the drawings:

FIG. 1 is a view showing the lay-out of the proportioning mechanism as it is mounted on a vehicle chassis. The view shows the general lay-out of the brake control levers and proportioning devices.

FIG. 2 is a cross-section view showing the front and rear brake control valves and their relationship to the fulcrum changing mechanism for operating both valves.

FIG. 3 is a cross section view of the shock absorber which is connected between the fulcrum changing rod and the load responsive mechanism.

FIG. 1 shows a vehicle chassis with the body shown in phantom on this chassis. The frame is indicated at 1 which is mounted on the vehicle wheels 2 and 3 in a conventional manner. A brake operating lever 4 is mounted for operation within the vehicle cab. The lever 4 controls the brake rod 5 which is directly connected to the bell crank arm 6. The bell crank arm 6 extends into the fulcrum changing mechanism. An air reservoir 7 is shown with conduits 8 connecting the conduits 9 and 10 which feed into the front valve 11 and the rear valve 12. An outlet conduit 13 leads from the front valve 11 to the front wheel braking structure 14. An outlet conduit 15 leads to the rear wheel braking structure 16.

A bell crank lever 17 is also mounted on the frame of the vehicle with one portion extending rearward to engage a link 18. The link 18 extends downward to an arm 19 which is directly connected to the rear axle housing 20. If the distance between the frame 1 and the rear axle housing 20 is varied due to an increased or decreased load, the bell crank lever 17 is also pivoted.

The bell crank lever 17 also has an arm extending upward which engages a rod 21 which extends forward into the shock absorber 22. The shock absorber 22 will be further described in a later paragraph. The forward end of the shock absorber 22 is connected to a fulcrum rod 23 which extends into the fulcrum changing mechanism indicated at 24.

FIG. 2 illustrates the fulcrum changing mechanism in a cross section view. The housing of this mechanism 25 encloses the lever and linkage mechanism for proportioning the braking of the front and rear wheels. The front brake control valve housing 26 is connected to the lower and forward portion of housing 25. At the lower rearward end portion of housing 25 is connected a rear brake valve housing 27 for controlling the rear brakes. The brake rod 5 is connected to the bell crank 6 by the connecting member 28, pin 110, and the nut 29. The bell crank 6 is provided with a flexible seal 30 where it enters the housing 25. A bell crank 6 is pivoted on a bracket 31 which is mounted on the internal and upper portion of the housing 25. The rearward end of the bell crank 6 is provided with a roller 32 rotatably mounted on a ball bearing assembly 33 and pin 111. The pivoting point of the bell crank 6 is also mounted on a ball bearing assembly 34 which, in turn, is rotatably mounted on a pin 35 which is directly connected to the bracket 31. An additional link 36 is also mounted on pin 35 between the bracket 31 and the bell crank 6. This link 36 extends forward and is provided with an off-set portion 37 which extends laterally to avoid interference with the fulcrum changing rod 23. This laterally extending portion 37 is also the means for mounting an adjusting screw 38. Screw 38 threadedly engages a portion 37 of link 36 and also has a locking nut 39 for setting the link member 36 in the desired position in relation to the bell crank 6.

An additional screw member 40 is provided for engagement of the opposite side of the bell crank 6. Screw 40 also has a locking nut 41 for changing the stop position of bell crank 6. Screw 40, being threadedly engaged to the housing 25, may be rotated inward or outward to provide the desired position of the bell crank in relation to the rear brake control valve.

The rear brake control valve is mounted within the housing 27. An inlet port 42 is connected to the conduit 10 which is connected to conduit 8 and the air pressure reservoir 7. The outlet port 43 is connected to the conduit 15 which in turn is directly connected to the rear braking structure 16 for actuation of the rear brakes.

The rear brake control valve is actuated by the roller 32 which bears against the upper portion of a cup-shaped member 44 which is inserted within a sleeve 45. The sleeve 45 has a radial flange on its lower portion for engaging housing 25. The radial flange 46 fits within the upper portion of the rear brake valve control housing 27 where they adjoin the housing 25.

A valve actuating sleeve 47 is mounted within the cylinder portion of the valve housing 27. The upper portion of sleeve 47 is connected to the cup-shaped member 44 by means of two compression springs 48 and 49. As the roller 32 is moved downward, the cup-shaped member 44 compresses springs 48 and 49 and thereby forces the sleeve member 47 axially downward. The sleeve member 47 also carries a seal member 50 and a valve spool 51 in the downward direction. This sleeve member 47 operates in opposition to a spring 52 which is mounted between the sleeve member 47 and a seating portion in the housing member 27. This spring 52 operates as a return means for the sleeve 47.

As the sleeve member 47 moves downward carrying the valve spool 51, the valve portion 53 unseats from the valve seat 54. This valve spool 51 operates in opposition to a spring 55. Spring 55 is mounted between the valve seat portion 53 and a threaded fitting 56. Fitting 56 with seal 57 is mounted on the lower portion of the housing 27 by means of a threaded portion on the inner periphery of housing 27. The fitting 56 is also provided with inlet passages 58 which extend from the port 42 to the internal portion of the lower end of housing 27.

As the valve portion 53 of spool valve 51 moves away from its mating seat 54 on the valve housing 27, air pressure is permitted to pass into the valve chamber 59 until pressure in this area causes the valve 53 to close, this occurs when the pressure in 59 is able to balance the spring force of 48 and 49. When the spring pressure is reduced, air is released through passage 60 to chamber 61 and to atmosphere through port 115.

The front brake control valve is mounted on the lower front portion of housing 25. The structure of this valve is identical with that of the valve for controlling the rear brake mechanism. This valve is provided with an inlet port 65 and an outlet port 66 and an exhaust port 113. The valve is operated by means of a roller 67 which is rotatably mounted on a ball bearing assembly 68 which is directly connected by a pin 69 to the actuating arm 70. The actuating arm 70 is pivotly connected to the link 36 through a ball bearing assembly 71 and pin 72. The arm 70 pivots on a roller 73 which is connected to the fulcrum changing arm 23 through a ball bearing assembly 74 and pin 75, pin 75 being directly connected to the fulcrum changing arm 23.

The fulcrum changing arm is slidably connected to the housing 25 and an end plate 76 which is mounted to the housing 25 by means of two screws 77 and 78. The fulcrum changing arm is also provided with annular members fitting about the round fulcrum changing arm 23. The annular member 79 is fastened to the fulcrum changing arm 23 by pin 80. The annular member 81 is fastened to the fulcrum changing arm 23 by pin 82. The rearward end of the fulcrum changing arm 23 is provided with a connecting portion 83 for receiving a pin 84.

Pin 84 pivotly connects the arm 23 with the forward end of the shock absorber 22. The shock absorber comprises housing portion 85 which is threadedly connected to an end portion 86. The end portion 86 has a hollow cylinder portion for receiving the rod member 21 which slidably moves within portion 86 of the shock absorber. The end portion 86 is also provided with the connection for receiving pin 84 which pivotly engages the rod member 23. This pin connection is offset to allow reciprocating movement of rod 21. The housing member 85 of the shock absorber 22 also has a sleeve member 87 on its rearward end. Sleeve member 87 is rigidly connected to the housing member 85 and has a hollow cylindrical internal portion for permitting rod 21 to slide axially within. The rod 21 is connected to a second sleeve 88 by means of a pin 89.

Sleeve 88 has two washers 90 and 91 abutting both sides and held resiliently in position by means of springs 92 and 93. Three screws 94 are also provided on the housing member 85. These screw members 94 provide a stop for the washers 90 and 91 as the rod and sleeve 88 operate against the opposite spring within the shock absorber. This shock absorber eliminates sudden movements of rod 21 due to bumps in the road on which the vehicle is traveling from being transmitted to the fulcrum changing rod 23. The rear portion of rod 21 is connected to the bell crank lever 17 as previously described in the specifications.

The brake proportioning mechanism operates in this manner: As the brake pedal 4 is depressed, the brake rod 5 moves forward thereby pivoting the bell crank arm 6. The bell crank arm 6 pivots on the bracket 31 forcing the cup-shaped member 44 of the rear brake valve control downward. As the cup-shaped member 44 is forced downward, the springs 48 and 49 create a force on the sleeve member 47. The additional force on the sleeve member 47 moves the sleeve downward carrying with it the valve spool 51. This movement is in opposition to spring 52, and spring 55, and unseats the valve portion 53 from its seat 54 in the housing 27. As the valve portion 53 is unseated from the valve seat 54, the air pressure which is present within the chamber 100 is permitted to pass around the valve 53 into the chamber 59. Air pressure in chamber 59 immediately passes outward through the port 43. This provides for actuation of the rear brakes.

The bell crank arm 6 also pivots the link 36 and the arm 70. The arm 70 pivots at approximately its center point on roller 73 in the position shown. As arm 70 pivots, the roller 67 is forced downward thereby actuating the front brake control valve 11 in a similar manner to that of the rear brake control valve 12 as previously described. The actuation of both valves simultaneously provides for approximately an equal distribution of pressure to both front and rear brakes. This proportion may be changed by adjusting of screws 40 and 38.

When a load is placed upon the vehicle, the distance from frame 1 to the rear axle 112 and rear axle housing 20 is decreased. The change in distance between the frame 1 and rear axle housing 20 moves the link 18 in relation to the frame 1 by means of arm 19 which is directly connected to rear axle housing 20. The changing position of link 18 pivots the bell crank lever 17. This pivoting movement in turn moves the fulcrum changing arm 23 by a force through the shock absorber 22. An increased load moves the fulcrum changing arm 23 forward, thereby moving the fulcrum point on lever 70 in the forward direction. As the fulcrum point or roller 73 moves forward, the forward end of link 70 moves a shorter distance downward as the rearward end of link 70 is moved upward by means of link 36. The decreasing downward movement of the roller 67 is proportional to the forward movement of the roller 73, the movement of the roller 73 being in direct proportion to the amount of load carried on the vehicle. This change of the fulcrum on the arm 70 thereby decreases the air pressure for actuating the front wheel brakes in relation to the actuating force of the rear wheel brakes. In this manner, the brakes have a changing proportion in response to the load carried on the vehicle.

The shock absorber 22 provides for an over-travel of the rod 21. This over-travel eliminates the danger of any of the shock transmitted from the arm 21 due to unevenness in the road. The arm 21 oscillates within the shock absorber and the over-travel is permitted by the sleeve 88 moving in opposition to springs 92 or 93. The movement of the opposing end of the shock absorber which is transmitted to the fulcrum changing rod 23 is gradual. Any oscillations and sharp movements are eliminated within the shock absorber 22.

While the embodiment of the present invention as herein disclosed constitutes a preferred form, it is to be understood that other forms might be adopted.

What is claimed is as follows:

1. In a vehicle brake control mechanism comprising in combination, a front wheel braking means, a rear wheel braking means, a source of pressurized air, conduit means connecting said source of pressurized air with said front wheel braking means and said rear wheel braking means, a front brake control valve in said conduit means, a rear wheel brake control valve in said conduit means, a first lever pivotally mounted on the chassis engaging said rear wheel brake control valve, a second lever pivotally mounted on said chassis engaging said first lever, an arm pivotally connected to said second lever and engaging said front wheel brake control valve, a slideable element forming a fulcrum engaging said arm, a pivoting member connecting a member associated with a vehicle rear wheel and pivotally mounted on said vehicle chassis, a link connecting said pivoting member and said slideable element to shift said fulcrum in response to loading of said vehicle, means for actuating said first mentioned lever thereby controlling the actuation of said front wheel brakes and said rear wheel brakes in response to the load carried on said vehicle.

2. In a vehicle control mechanism comprising in combination, a front wheel braking means, a rear wheel braking means, a source of pressurized air, conduit means connecting said source of pressurized air with said front wheel braking means and said rear wheel braking means, a front wheel brake control valve in said conduit means, a rear wheel brake control valve in said conduit means, a lever pivotally mounted on the vehicle chassis engaging said rear wheel brake control valve, a second lever pivotally mounted on said chassis engaging said first lever, an arm pivotally connected to said second lever engaging said front wheel brake control valve, a shifting fulcrum engaging said arm on its intermediate portion, an element pivotally mounted on said chassis engaging a member associated with one of the rear wheels, a link connecting said element to said shifting fulcrum to shift the fulcrum in response to the load carried on said vehicle chassis, means connecting first mentioned lever to a manual brake operating means for distributing the braking effort on said rear wheel brakes and said front wheel brakes in response to the load carried on said vehicle.

3. In a vehicle brake control mechanism comprising in combination, a front wheel braking means, a rear wheel braking means, a source of pressurized air, conduit means connecting said source of pressurized air with said front wheel brake means and said rear wheel braking means, a front wheel brake control valve in said conduit means, a rear wheel brake control valve in said conduit means, a lever pivotally mounted on the vehicle chassis engaging said rear brake control valve, a second lever pivotally mounted on said vehicle chassis contacting said first mentioned lever for operating in response to movement of said first mentioned lever, an arm pivotally connected to said second lever engaging said front brake control valve, a shifting fulcrum contacting the intermediate portion of said arm, an element pivotally mounted on said chassis and connected to a member associated with one of the rear wheels, a shock absorber pivotally connecting said element to said shifting fulcrum to change the fulcrum point on said arm in response to the load carried on said vehicle, manual means for pivoting said first mentioned lever for actuation of said rear wheel brakes in an increasing proportion relative to said front wheel brakes in response to the load carried on said vehicle.

References Cited in the file of this patent

UNITED STATES PATENTS

| 2,270,366 | Wolf | Jan. 20, 1942 |

FOREIGN PATENTS

| 1,121,624 | France | May 7, 1956 |